: 3,332,911
PRODUCTION OF FAST-CURING PHENOL-ALDE-
HYDE NOVOLAC RESINS EMPLOYING A BORIC
ACID OR BORATE SALT CATALYST
Rodney M. Huck, Longmeadow, Mass., assignor to Monsanto Company, St. Louis, Mo., a corporation of Delaware
No Drawing. Filed Aug. 25, 1958, Ser. No. 757,085
10 Claims. (Cl. 260—57)

The present invention relates to the production of novolac resins and more particularly to the production of resins of this type exhibiting fast cure rates.

Novolac resins are characteristically nonreactive, thermoplastic resins which when contacted with hexamethylene tetramine or other hardening agents become activated and can then be cured at elevated temperatures to produce thermoset materials. These resins have broad utility in the production of molding powders, coatings and as bonding agents in the production of foundry molds, grinding wheels and other abrasive products.

Novolac resins result from catalytic condensation type reactions of aldehyde and a phenol. The reaction is generally considered as taking place in two stages, the initial stage which is sometimes considered to be addition of the reactants to one another, with or without partial condensation, producing an intermediate reaction product, followed by the secondary stage or completion of condensation during which water is cut off the intermediate reaction product to form the final resin product or novolac. For purposes of this disclosure, these stages will generally be referred to as the initial and the secondary stages.

Earlier novolac resins have been produced by condensation reactions using less than one mol of aldehyde per mol of phenol, the same being carried out under strong acid conditions, more specifically at pH's of less than about 3. However, the novolac resins produced in this manner manifest at least one serious deficiency, to wit: they are slow to cure. More recently, various procedures have been prepared which are designed to produce novolacs having shortened or faster curing rates. In the first of these, catalysts, capable of contributing a pH of about 4–7, are used together with high temperatures. The catalysts used are the oxides of certain defined metals such as zinc, magnesium and aluminum. However, in order to carry out this process, it is necessary to use a large excess of phenol. More recently another catalytic process using comparatively lower temperatures, but capable of inducing a pH condition of 4–7 in the reaction medium, has been proposed with which to produce these resins; again the resins produced manifest shortened curing periods over the conventional novolac resins. The catalysts used by this process are organic salts of metals such as manganese, zinc and cadmium. It is contended that this process has succeeded in cutting down the phenol requirement over that required for the process immediately preceding.

Both of the preceding processes require a large excess of phenol. This has been found necessary in order to prevent gelation of the reaction mixture during the secondary stage of the reaction. However, this excess of phenol detracts from the usefulness of the product in that it tends to contribute a soft resin product rather than one which is desirably brittle and capable of being ground. To express it differently the resin which results has a melting points below that which is desirable. To remove the excess phenol and relieve this condition, requires further expense in a process already costly as a result of initially charging excess phenol. If less than the prescribed amount of phenol or higher amounts of aldehyde are used neither of the proposed processes can be carried out to successful completion, in that the intermediate reaction products will gel during or before the secondary stage of the reaction.

Accordingly it is the principal object of the present invention to produce novolac resins having shortened curing times.

Other objects of the invention will in part be obvious and will in part appear hereinafter.

These and other objects of the present invention are attained by a catalytic condensation process which comprises reacting up to one mol of an aldehyde per mol of a phenol at a temperature of 100–235° C. and a pH of 4–7, using a reaction catalyst selected from the class consisting of boric acids and borate salts of divalent electropositive metals above hydrogen in the electromotive series with which to produce novolac resins having shortened curing times.

The following examples are given in illustration of the invention. Where parts are mentioned, parts by weight are intended unless otherwise described.

*Example I*

One hundred parts of phenol, 43 parts of 37% formalin and 1 part of manganese acetate are refluxed at 103° C. under atmospheric conditions until at least 95% of the formaldehyde has been combined. This represents a period of about 1 hour. The intermediate reaction product is then subjected to the secondary stage of the reaction, which is combined with dehydration by distilling under atmospheric conditions to 160° C. After 30 minutes, a vacuum up to 28 in. Hg is applied to remove unreacted phenol. The resin is then poured into a pan and allowed to cool at room conditions.

*Example II*

The reaction conditions of Example I are repeated with the exception that 64 parts of 37% formalin are used. When the intermediate product is subjected to the secondary stage combined with dehydration at atmospheric conditions, the intermediate product gels at 135° C. indicating that condensation processes using divalent metal salts of organic acid as catalysts require a large excess of phenol in order to be successful. The excess of phenol required is greater in amount than that required to initiate conventional condensations in which a strong acid catalyst is used together with a pH condition of less than 3.0 in the reaction medium.

*Example III–VII*

Examples III–VII are carried out in the amounts defined in the table following. In each of the examples the reaction medium is refluxed at an initial temperature of 125–140° C. for 2–5 hours after which the temperature is noted to have dropped to approximately 105° C. The reaction product is then subjected to the secondary stage together with being dehydrated to 120° C. Vacuum up to 28 ins. Hg is then applied and the temperature raised to about 130° C. The resins are then allowed to cool under room conditions.

*Example VIII*

A novolac resin is produced by the conventional strong acid-catalyzed procedure by charging 100 parts of phenol, 65 parts of 37% formalin and about .2 part of sulfuric acid into a reaction kettle and refluxing at atmospheric pressure until about 99% of the formaldehyde has become combined. The novolac product is then dehydrated up to 120° C. This temperature is continued under vacuum of about 28 ins. Hg to remove phenol and other volatiles. The resin which results is allowed to cool under room conditions.

The following conditions and indicia are observed with relation to the preceding examples and their reaction products. Because an incomplete product results from Example II, indicia regarding molding characteristics of the product is unavailable.

(d) Hot Rigidity: This is obtained by deforming the bottom of the ASTM molded cup immediately upon release from the mold. The deflection in inches is recorded as the hot rigidity.

The preceding test results indicate that molding com-

TABLE I

| Resin Ex. No. | Catalyst | Parts Paraform (91%) | Parts Phenol | Formaldehyde-Phenol Molar Ratio | pH reaction | Resin Yield Percent on Phenol | M.P., °C. | Cure, Sec.* |
|---|---|---|---|---|---|---|---|---|
| I | 1 part Manganese Acetate | 17.5 (43 parts Formalin) | 100 | 0.5 to 1.0 | 6.8 | 71 | 73 | 34 |
| II | do | 26.4 (64 parts Formalin) | 100 | 0.79 to 1.0 | | (Resin gelled) | | |
| III | 1 part Boric Acid | 29 | 100 | 0.84 to 1.0 | 5.7 | 99 | 86 | 56 |
| IV | 0.56 part Boric Oxide (equiv. to 1.0 part boric acid) | 29 | 100 | 0.84 to 1.0 | 5.7 | 97 | 83 | 60 |
| V | 1 part Boric Oxide | 29 | 100 | 0.84 to 1.0 | 5.2 | 100 | 75 | 60 |
| VI | 1 part Zinc Borate | 27 | 100 | 0.77 to 1.0 | 7.0 | 99 | 82 | 30 |
| VII | 0.5 part Zinc Borate | 27 | 100 | 0.77 to 1.0 | 7.0 | 95 | 85 | 31 |
| VIII | Conventional Acid Catalyst (sulfuric) | 26.4 (65 parts Formalin) | 100 | 0.75 to 1.0 | 2 | 100-102 | 80-90 | 60-90 |

*Hot plate cure 10 parts hexamethylene tetramine per 100 parts resin at 150° C.

Consideration of the information contained in Table I, indicates that the yield amounts of resin produced in accordance with the process of the present invention, i.e., resins of Examples III–VII, show to advantage when compared to yield amounts of resins produced by the condensation reactions catalyzed with divalent metal salts or organic acids exemplified by Example I. With respect to curing properties, the resins provided in accordance with the present invention, and here attention is particularly directed to Examples VI and VII, show a graphic advance in curing time over the strong acid-catalyzed or conventional type novolac resins as exemplified by Example VIII, and in addition they compare favorably with the resin of Example I.

Each of the resins provided in the preceding examples, with the exception of the incomplete product of Example II, is provided as a molding powder using the following formulation:

Components:                                      Percent by weight
Resin (Example 1, 3–8) ------------------ 43.5
Woodflour -------------------------------- 48.2
Hexamethylenetetramine ------------------ 6.1
Lubricant -------------------------------- 0.4
Dye -------------------------------------- 1.8

When subjected to the indicated testing procedures the respective molding formulations exhibited the following results:

TABLE II

| Resin Ex. No. | (a) ASTM Flow (Secs.) | (b) ASTM Cup Cure (Secs.) | (c) Bottle Cap Cure (Secs.) | (d) Hot Rigidity (inches) | Finish |
|---|---|---|---|---|---|
| I | 10/200 (stiff) | 28 | 14 | 0.030 | Excellent. |
| III | 10/150 | 24 | 11 | 0.075 | Do. |
| IV | 11/150 | 24 | 11.5 | 0.058 | Do. |
| V | 7/150 | 26 | 12 | 0.090 | Do. |
| VI | 8/150 | 24 | 11.5 | 0.055 | Do. |
| VII | 14/150 | 24 | 11 | 0.052 | Do. |
| VIII | 10/150 | 32 | 16 | 1.130 | Good. |

Test Procedures:
(a) Flow Times: A.S.T.M. Test D731–57.
(b) A.S.T.M. Cup Cure: This is the minimum time in seconds necessary to produce a blister-free molding (ASTM cup).
(c) Bottle Cap cure: This is the minimum time in second necessary to produce a blister-free 28 mm. diameter bottle cap at a temperature of 340° F.

pounds using novolac resins produced in accordance with the present invention (Examples III–VII) require shorter curing times in the mold than those using resins resulting from organic acid salt catalysis (Example I), and those using conventional novolac resins. (Example VIII), in this regard see the Cup Cure test results. Shortened curing times on the part of molding powders using the resins of the present invention are also reflected by the Bottle Cap Cure test results. With respect to flow characteristics, molding compound formulated using the resin of Example I, although having the lower melting point (see Table I), nevertheless result in stiffer materials than those produced in accordance with the present invention. Consequently if the material produced according to Example I does have a melting point approaching that of the presently disclosed materials the resulting stiffness or flow characteristics will limit its usefulness for certain molding operations and particularly molding of large items. The results of the Hot Rigidity test indicate that molding compounds using the resins of the present invention have a broader range of utility in this regard. Molding compounds using the resins of Example I exhibit a sufficiently high rigidity as to indicate that a high incidence of cracking and breaking would result in moldings fabricated from the same, during ejection from a hot mold. By comparison and equally as undesirable, indicated lack of rigidity or low rigidity of molding compounds using the conventional type novolac of Example VIII attest to their soft setting propensities which would lend a high incidence of distortion in moldings fabricated from the same, the distortion resulting during ejection from a hot mold.

The present invention relates to a method for producing fast curing novolac resins constituting a catalytic condensation reaction in which up to one mol of aldehyde is combined with each mol of phenol at a temperature of 100–235° C. to produce a novolac resin.

The condensation involves two stages generally, an initial stage during which the aldehyde and phenol react to form an intermediate product followed by a second stage during which the condensation is completed by splitting off water to form the novolac resin. Dehydration can be carried out simultaneously with the second stage, or subsequent thereto. While dehydrated novolac resins have been emphasized, those which are partially dehydrated as well as those which remain undehydrated and those which have been dehydrated and later diluted have utility as resins and are intended. The condensation reaction or overall reaction can be carried out either stepwise or continuously, depending upon the choice of reaction conditions, more specifically those of temperature and pressure.

In the stepwise process, the initial reaction is carried out at a temperature of about 100–140° C. preferably 125–140° C. At the lower temperatures the time for reaction is extended somewhat. Termination of the initial reaction can be conventionally determined in accordance with the amount of aldehyde consumed or combined in forming the intermediate reaction product. In this latter regard, the amount of aldehyde initially charged is less than about one mole per mole of phenol. A more preferred range is .70–.90 mol of aldehyde per mol of phenol. Upon determination that the aldehyde is essentially combined in the desired amounts, or on the order of greater than 95% and preferably greater than 99% of the initially charged amount of aldehyde, the secondary stage can be exercized. Complete condensation of the intermediate product is obtained in the second stage of the reaction, by raising the temperature to 140–235° C., more particularly 140–180° C. Dehydration of the resin can be carried on during the second stage reaction and a partial vacuum can be used to facilitate this, however, the use of vacuum during this stage will probably result in loss of reactants which become volatilized. Consequently it is recommended that dehydration, if carried on during the second stage be under atmospheric pressure conditions. This calls further for the use of temperatures at the lower end of the disclosed range. At temperatures above approximately 140° C. superatmospheric pressures are involved. Alternatively dehydration is carried on after completion of the second stage. The process can then be followed by vacuum distillation or other extraction procedures directed to removal of excess phenol and volatiles.

In the continuous-type process, temperature conditions of 140–235° C., more particularly 180–200° C., are used for both the initial stage and the secondary stage of the reaction. The use of superatmospheric pressure is prescribed during both stages of the reaction. Dehydration is carried out under atmospheric pressure conditions, after condensation has been completed. Extraction of excess phenol and volatiles through vacuum distillation or the like can then be carried out as desired.

Some variation as to temperatures and pressure conditions will result from changes in the aldehyde and phenol starting materials. In addition, variations can also result from the choice of catalyst, which will be discussed later in more detail. It is also quite usual for the temperatures, particularly with respect to the two step process, to drop during the reaction, and incidently this drop can be utilized in determining when termination of the initial step has been effectuated. This is particularly true when using anhydrous or nonaqueous forms of aldehyde such as paraform. The reactions are expeditiously carried out under reflux conditions as further determined by temperature-pressure relationships.

The reaction, considered broadly, as to both the initial stage and the secondary stage thereof, is carried out at a pH range of 4–7 with the further preference directed to a pH of 5–6. Again this will vary somewhat within the described ranges due to the materials charged and the reaction catalyst chosen.

The reaction catalysts proposed by the present invention consist of boric acids and borate salts of divalent electropositive metals which are above hydrogen in the electromotive series. Boric acids include in addition to the ortho-boric acid, meta-boric acid, pyro-boric acid, perboric acid, benzyl boric acid, ethyl boric acid and other aryl and alkyl substituted boric acids, as well as boric acid complexes as exemplified by borotartaric acid and boromolybdic acid and the like. The borate salts which are useful as catalysts include beryllium ortho-borate, calcium metaborate, calcium tetraborate, cadmium borate, lead metaborate, magnesium orthoborate, magnesium metaborate, magnesium pyroborate, zinc borate and the borates of barium, iron (ferrous), nickel, strontium and tin, it being noted that in the case of polyvalent metals such as chromium, iron, nickel and tin that the divalent cationic variation is used. Mixtures of the preceding acids and salts can also be used as reaction catalysts. The preferred catalysts are the boric acids and calcium, manganese and zinc borates. The amount of reaction catalyst enjoys a broad range with general usage directed to amounts between the .1 to 6.0% by weight based on the amount of phenol. In a more preferred embodiment, a range of 0.5 to 2.0% by weight of reaction catalyst by weight of phenol is desirable. Within these ranges variations can result from selection of the reaction catalyst or mixed catalyst as well as solution of starting materials.

The reaction is carried out between aldehydes and phenols. The aldehydes to be used include formaldehyde in its various forms, such as formalin (35–50%), paraform (91–100%), and other aliphatic aldehydes exemplified by acetaldehyde, proprionaldehyde and the like, aromatic aldehydes exemplified by benzylaldehyde, also cyclic aldehyde such as furfural and the like. The phenols to be used include normal phenol and meta substituted phenols such as, methyl, ethyl, phenyl and like substituted phenols. As indicated previously, the starting amounts of aldehyde to phenol range up to one mol of aldehyde per mol of phenol with the further preference directed to 0.7 to 0.9 mol of aldehyde per mol of phenol.

It will thus be seen that the objects set forth above among those made apparent from the preceding description are efficiently attained and since certain changes may be made in carrying out the above process and in the resulting resin products without departing from the scope of the invention, it is intended that all material contained in the above description shall be interpreted as illustrtaive and not in a limited sense.

What is claimed is:

1. In a method for producing fast-curing novolac resins which consists of catalytically reacting 0.7 to .9 mol of a saturated monofunctional aldehyde per mol of phenol at a temperature of 100–235° C. and a pH of 4–7, the improvement which consists of using as the sole reaction catalyst 0.1–6.0% by weight based on the amount of phenol of a reaction catalyst selected from the class consisting of boric acids, borate salts of divalent barium, beryllium, cadmium, calcium, chromium, cobalt, iron, lead, magnesium, manganese, nickel, strontium, tin, zinc and mixtures of the same, said saturated monofunctional aldehyde containing a single aldehyde group.

2. In a catalytic reaction for producing fast-curing novolac resins which consists of an initial stage of reacting 0.7–0.9 mol of formaldehyde per mol of phenol at a temperature of 100–140° C. to produce an intermediate product and thereafter a second stage of further reacting the intermediate product at a temperature of 140–235° C. and a pH of 4–7 to produce said novolac resin, the improvement which consists solely of using as a reaction catalyst present in both stages 0.5–2.0% by weight of zinc borate as determined on the weight of the phenol.

3. In a catalytic method for producing fast-curing novolac resins which consists of an intial stage of reacting 0.7–0.9 mol of formaldehyde per mol of phenol at a temperature of 100–140° C. until the aldehyde is essentially combined with the phenol and a second stage of further reacting at a temperature of 140–235° C. and wherein the reaction medium is maintained at a pH of 4–7 the improvement which consists solely of using as a reaction catalyst present in both stages 0.5–2.0% by weight of ortho-boric acid as determined on the weight of the phenol.

4. A catalytic reaction for producing fast curing novolac resins which consists of reacting 0.7–0.9 mol of formaldehyde per mol of phenol at a temperature of 140–235° C. and a pH of 4–7, to produce said resin, the improvement which consists solely of using as a reaction catalyst 0.5–2.0% by weight of zinc borate as determined on the weight of the phenol.

5. In a catalytic reaction for producing fast-curing novolac resins which consists of reacting 0.7–0.9 mol of formaldehyde per mol of phenol at a temperature of 140–

235° C. and a pH of 4–7 the improvement which consists solely of using as a reaction catalyst 0.5–2.0% by weight of ortho-boric acid as determined on the weight of the phenol.

6. Fast-curing novolac resins produced by catalytically reacting 0.7–0.9 mol of formaldehyde per mol of phenol at a temperature of 100–235° C. and a pH of 4–7 in the presence of 0.1–6.0% by weight based on the weight of the phenol of a reaction catalyst selected from the class consisting of boric acids, borate salts of divalent barium, beryllium, cadmium, calcium, chromium, cobalt, iron, lead, magnesium, manganese, nickel strontium, tin, zinc and mixtures of the same.

7. In making a novolac resin, the process which comprises forming an aqueous mixture having a pH of from 4–7 of 1 mole of a phenol with about 0.4–1 mole of formaldehyde and a condensation catalyst consisting essentially of borate selected from the group consisting of zinc, manganese and nickel borates, in the proportion of about 0.1–5 parts by weight for 100 parts of the phenol, heating the said mixture at a temperature not above refluxing under the prevailing pressure until a thermosetting intermediate forms, and then heating the intermediate under distillation conditions, to remove therefrom remaining distillable materials, at a temperature below thermosetting of the intermediate until the intermediate is converted to a thermoplastic product that when cooled is hard and grindable.

8. In making a resinous novolac condensation product, the process which comprises forming an aqueous mixture having a pH of from 4–7 of a phenol, formaldehyde and condensation catalyst consisting essentially of the borate of a metal selected from the group consisting of zinc, manganese and nickel in the proportion of about 0.1–5 parts by weight of the borate for 100 parts of the phenol, heating the said mixture until condensation occurs to an intermediate that is thermosetting under test at a temperature of 150° C., and then continuing the heating of the intermediate and distilling water therefrom at a temperature below that of thermosetting until the said intermediate is converted to a thermoplastic product.

9. The process of claim 8, the said phenol being phenol $C_6H_5OH$.

10. The process of claim 8, the said phenol being cresol.

References Cited

UNITED STATES PATENTS

| | | | |
|---|---|---|---|
| 1,678,107 | 7/1928 | Deutsch et al. | 260—57 |
| 2,304,431 | 12/1942 | Walker | 260—57 |
| 2,748,101 | 5/1956 | Shappell | 260—57 |
| 2,838,473 | 6/1958 | Partansky et al. | 260—57 |
| 2,855,382 | 10/1958 | Mitchell | 260—57 |
| 3,083,183 | 3/1963 | Boschert et al. | 260—57 |

FOREIGN PATENTS

| | | |
|---|---|---|
| 492,731 | 12/1936 | Great Britain. |
| 495,133 | 9/1919 | France. |

WILLIAM H. SHORT, *Primary Examiner.*

H. BUESTEIN, M. STERMAN, H. C. SCHAIN, T. C. TULLY, W. G. TORCHIN, A. D. RICCI, J. C. MARTIN, M. GOLDSTEIN, *Assistant Examiners.*